US012505566B2

(12) United States Patent
Xu et al.

(10) Patent No.: US 12,505,566 B2
(45) Date of Patent: Dec. 23, 2025

(54) DETECTING AND FILTERING THE EDGE PIXELS OF 3D POINT CLOUDS OBTAINED FROM TIME-OF-FLIGHT SENSORS

(71) Applicant: GM Cruise Holdings LLC, San Francisco, CA (US)

(72) Inventors: Zhanping Xu, Sunnyvale, CA (US); Glenn D. Sweeney, Sebastopol, CA (US); Brandon S. Seilhan, San Ramon, CA (US); Juan Sebastian Hurtado Jaramillo, Oakland, CA (US); Kartheek Chandu, Dublin, CA (US); Alexander Lesnick, Alexandria, VA (US); Robert Vets, Seattle, WA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 309 days.

(21) Appl. No.: 18/333,278

(22) Filed: Jun. 12, 2023

(65) Prior Publication Data

US 2024/0412393 A1 Dec. 12, 2024

(51) Int. Cl.
*G06T 7/521* (2017.01)
*G01S 17/894* (2020.01)
*G06T 5/70* (2024.01)

(52) U.S. Cl.
CPC ............ *G06T 7/521* (2017.01); *G01S 17/894* (2020.01); *G06T 5/70* (2024.01); *G06T 2207/10028* (2013.01)

(58) Field of Classification Search
None
See application file for complete search history.

(56) References Cited

U.S. PATENT DOCUMENTS

2016/0381342 A1\* 12/2016 Matsuoka ................ G06T 5/50
  348/47
2020/0133272 A1\* 4/2020 Chong ................ G05D 1/0088
(Continued)

OTHER PUBLICATIONS

Sajjadi et al., "Depth Estimation Through a Generative Model of Light Field Synthesis," In: Rosenhahn, B., Andres, B. (eds) Pattern Recognition. GCPR 2016. Lecture Notes in Computer Science, vol. 9796. Springer, Cham. https://doi.org/10.1007/978-3-319-45886-1_35 (Year: 2016).\*

(Continued)

*Primary Examiner* — Michelle M Koeth
(74) *Attorney, Agent, or Firm* — CANTOR COLBURN LLP

(57) ABSTRACT

Systems and techniques are provided for identifying and filtering edge pixels from a 3D point cloud from a time-of-flight sensor. An example method includes receiving a first depth map that is based on an image frame captured by a time-of-flight (ToF) sensor, wherein the first depth map includes a plurality of measurements corresponding to a pixel array of the ToF sensor; generating a second depth map by shifting the plurality of measurements corresponding to the pixel array in at least one direction; comparing the first depth map with the second depth map to determine a measurement difference for each pixel in the pixel array; and identifying one or more edge pixels in the pixel array corresponding to at least one edge region in the image frame, wherein the measurement difference associated with the one or more edge pixels is greater than an edge threshold.

20 Claims, 14 Drawing Sheets

(56) References Cited

U.S. PATENT DOCUMENTS

| | | | |
|---|---|---|---|
| 2020/0257306 A1* | 8/2020 | Nisenzon | G06V 20/56 |
| 2021/0233249 A1* | 7/2021 | Barish | G06Q 10/0838 |
| 2022/0357155 A1* | 11/2022 | Fujita | G01B 11/22 |
| 2022/0413144 A1* | 12/2022 | Mihara | G01S 17/931 |

OTHER PUBLICATIONS

Cippitelli et al., "Kinect as a tool for gait analysis: validation of a real-time joint extraction algorithm working in side view," Sensors (Basel), Jan. 14, 2015;15(1):1417-34. doi: 10.3390/s150101417 (Year: 2015).*

* cited by examiner

740

R₀
702

Rₓ
744

760

R₀
702

Rₓ
764

DETECTING AND FILTERING THE EDGE PIXELS OF 3D POINT CLOUDS OBTAINED FROM TIME-OF-FLIGHT SENSORS

BACKGROUND

1. Technical Field

The present disclosure generally relates to autonomous vehicles and, more specifically, to systems and techniques for detecting and filtering edge pixels of 3D point clouds obtained using time-of-flight sensors.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
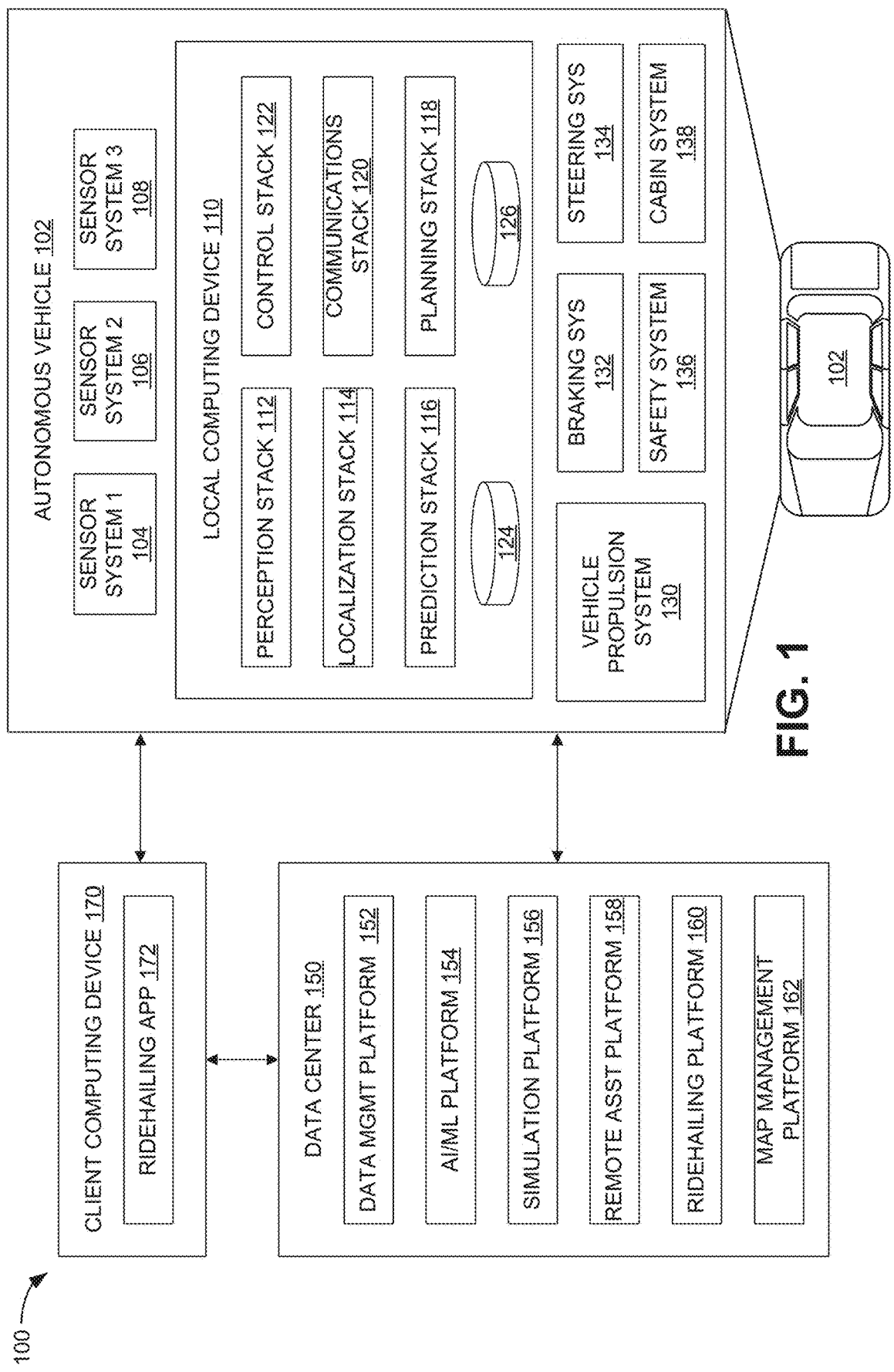
FIG. 1 is a diagram illustrating an example system environment that can be used to facilitate autonomous vehicle (AV) navigation and routing operations, in accordance with some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. For example, AVs can include sensors such as a camera sensor, a LIDAR sensor, and/or a RADAR sensor, amongst others, which the AVs can use to collect data and measurements that are used for various AV operations. The sensors can provide the data and measurements to an internal computing system of the autonomous vehicle, which can use the data and measurements to control mechanical systems of the autonomous vehicle, such as a vehicle propulsion system, a braking system, and/or a steering system, etc.

In some cases, an AV may use a time-of-flight sensor (e.g., time-of-flight camera) to measure distance to one or more objects in an environment of the AV. For example, depth data of objects in the environment can be determined based on frames (e.g., images or image frames) that are captured by a time-of-flight sensor. In some cases, the frames or images may be recorded using a temporally patterned illumination profile with a temporally coded aperture (e.g., blinking pixels). Depending on the intensity measurements, the images can be combined to form a depth map or depth image that can be used to determine distance to an object.

However, in some cases, one or more pixels in a time-of-flight sensor may receive a mixed signal that includes reflections from a foreground object and a background object and/or reflections from a single 3D object having a foreground portion and a background portion. In some examples, the depth information that is produced by such pixels (e.g., edge pixels, flying pixels, partial pixels, etc.) is inaccurate because the depth information will not accurately measure foreground object or background object. This problem can adversely affect AV operation as the point cloud used to identify and/or track objects may include false positives.

In some cases, conventional edge detection methods can be based on a 2D texture (e.g., shadow/contrast of the edge). In some examples, such methods may include convolution steps that are not applied consistently because some objects may have same "color" as background texture for detection. In addition, the convolution associated with such methods is slow and involves high levels of computing capacity as well as power consumption.

Systems and techniques are provided herein for identifying edge pixels for labeling and filtering. In some aspects, the systems and techniques described herein may derive the edge pixel information in the phase and/or distance domain. In some cases, edge pixel formation may be characterized by extending to background or floating to foreground. In some aspects, a depth frame differential operation may be used to obtain an edge pixel distribution map. In some configurations, the edge pixel distribution map can be used to identify edge pixels for labeling and/or filtering based on a threshold. In some aspects, the threshold may be a constant while in other aspects the threshold may be adaptive (e.g., based on one or more parameters associated with the pixels in the pixel array). For instance, the adaptive threshold may be based on depth information, phase information, grayscale image, active light of the sensor, etc.

FIG. 1 is a diagram illustrating an example autonomous vehicle (AV) management system 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridehailing service (e.g., a ridesharing service), a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridehailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridehailing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridehailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridehailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridehailing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridehailing platform 160 can interact with a customer of a ridehailing service via a ridehailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridehailing application 172. The client computing device 170 can be a customer's mobile computing device or a computing device integrated with the AV 102 (e.g., the local computing device 110). The ridehailing platform 160 can receive requests to pick up or drop off from the ridehailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some aspects, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridehailing platform 160 may incorporate the map viewing services into the ridehailing application 172 to enable passengers to view the AV 102 in transit en route to a pick-up or drop-off location, and so on.

While the autonomous vehicle 102, the local computing device 110, and the AV management system 100 are shown to include certain systems and components, one of ordinary skill will appreciate that the autonomous vehicle 102, the local computing device 110, and/or the AV management system 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 11.

Figure 2:
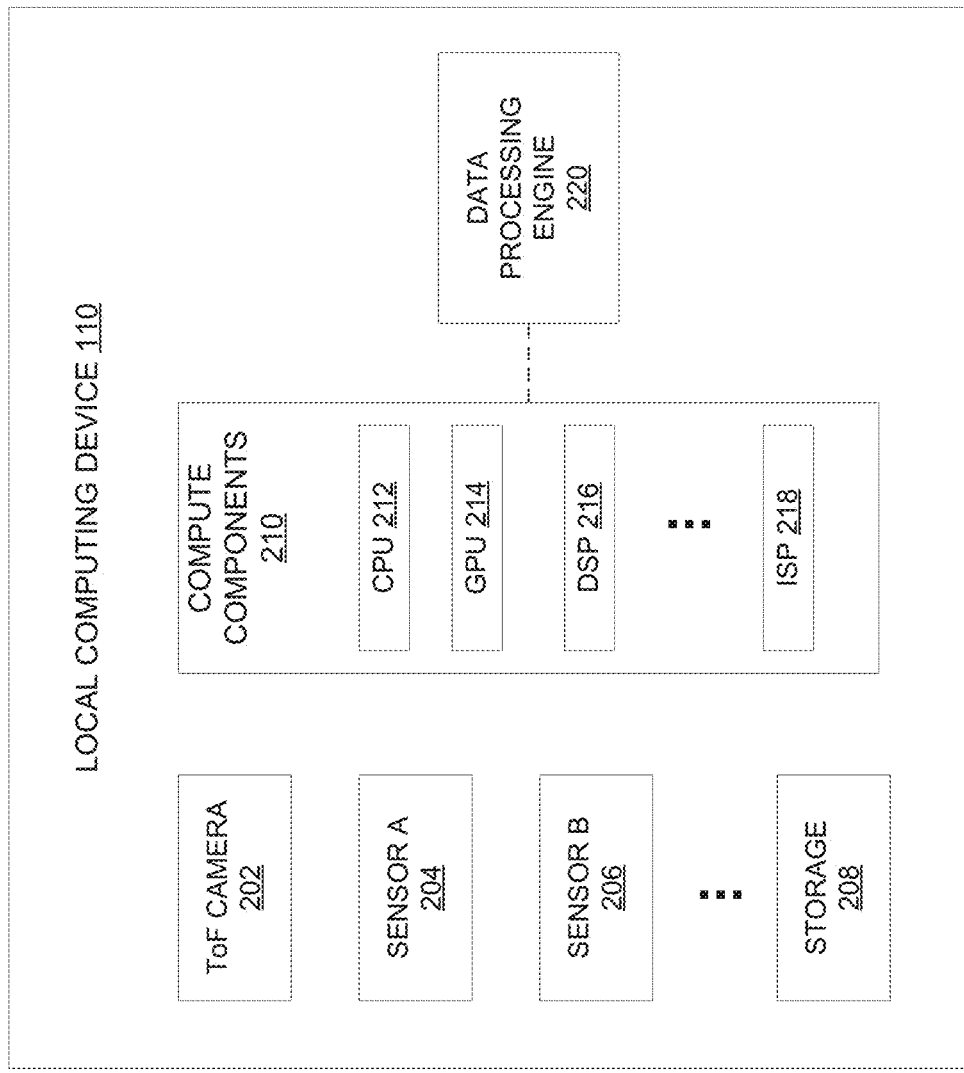
FIG. 2 is a block diagram illustrating an example of an electronic device used to capture sensor data, in accordance with some examples of the present disclosure.

FIG. 2 is a diagram illustrating an example of an electronic device used to capture sensor data. In this example, the electronic device includes or represents the local computing device 110 shown in FIG. 1. However, in other examples, the electronic device can include or represent any other device used to capture and process sensor data as further described herein.

In some examples, local computing device 110 can be configured to perform 3D image signal processing. In some aspects, local computing device 110 can be configured to provide one or more functionalities such as, for example, imaging functionalities, image processing functionalities, 3D image filtering functionalities, image data segmentation functionalities, depth estimation functionalities, phase unwrapping functionalities, AV perception detection functionalities (e.g., object detection, pose detection, face detection, shape detection, scene detection, etc.), extended reality (XR) functionalities (e.g., localization/tracking, detection, classification, mapping, content rendering, etc.), device management and/or control functionalities, autonomous driving functionalities, computer vision, robotic functions, automation, and/or any other computing functionalities.

In the illustrative example shown in FIG. 2, local computing device 110 can include a Time-of-Flight (ToF) camera 202 (also referred to as ToF sensor) and one or more sensors such as sensor A 204 and sensor B 206 (similar to sensor systems 104-108 as illustrated in FIG. 1). In some examples, ToF camera 202 can be a 3D ToF camera system, which is configured to create a 3D image of a scene or object (e.g., 3D point cloud or depth map). Non-limiting examples of the one or more sensors (e.g., sensor A 204 and/or sensor B 206) can include a camera, an ultrasonic sensor, an IMU, a depth sensor using any suitable technology for determining depth (e.g., based on ToF, structured light, or other depth sensing technique or system), a touch sensor, a LiDAR sensor, a RADAR sensor, a microphone, etc.).

In some examples, ToF camera 202 and/or one or more sensors (e.g., sensor A 204 or sensor B 206) can capture image data and generate frames based on the image data and/or provide the image data or frames to one or more compute components 210 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In the illustrative example of FIG. 2, local computing device 110 can include storage 208, which comprises any storage device(s) for storing data such as, for example and without limitation, image data, posture data, scene data, user data, preferences, etc. In some examples, storage 208 can store data from any of the components of local computing device 110. For example, storage 208 can store data or measurements from any of ToF camera 202, one or more sensors (e.g., sensor A 204, sensor B 206, etc.), compute components 210 (e.g., processing parameters, outputs, video, images, segmentation maps/masks, depth maps, filtering results, confidence maps, masks, calculation results, detection results, etc.), data processing engine 220, and/or any other components. In some examples, storage 208 can include a buffer for storing data (e.g., image data, posture data, etc.) for processing by compute components 210.

In some cases, local computing device 110 can include one or more compute components 210 such as a central processing unit (CPU) 212, a graphics processing unit (GPU) 214, a digital signal processor (DSP) 216, an image signal processor (ISP) 218, etc. In some aspects, local computing device 110 can use one or more compute components 210 to perform various computing operations such as, for example, image processing functionalities, precision predictions of image data as described herein, autonomous driving operations, extended reality operations (e.g., tracking, localization, object detection, classification, pose estimation, mapping, content anchoring, content rendering, etc.), detection (e.g., face detection, object detection, scene detection, human detection, etc.), image segmentation, device control operations, image/video processing, graphics rendering, machine learning, data processing, modeling, calculations, computer vision, and/or any other operations.

In some cases, one or more compute components 210 can perform image/video processing, machine learning, depth estimation, XR processing, device management/control, detection (e.g., object detection, face detection, scene detection, human detection, etc.) and/or other operations as described herein using data from ToF camera 202, one or more sensors (e.g., sensor A 204, sensor B 206, etc.), storage 208, and/or any other sensors and/or components. In some examples, one or more compute components 210 can implement one or more software engines and/or algorithms such as, for example, data processing engine 220 or algorithm as described herein. In some cases, one or more compute components 210 can implement one or more other or additional components and/or algorithms such as a machine learning model(s), a computer vision algorithm(s), a neural network(s), and/or any other algorithm and/or component.

In some aspects, data processing engine 220 can implement one or more algorithms and/or machine learning models configured to generate depth estimates, generate depth standard deviation, perform image processing, etc., as further described herein. In some examples, data processing engine 220 can be configured to detect and/or identify edge pixels (e.g., flying pixels, floating pixels, etc.). In some instances, data processing engine 220 may generate an edge pixel mask that can be used to perform further processing on edge pixels (e.g., delete edge pixels from 3D point cloud).

In some aspects, local computing device 110 can be part of, or implemented by, a single computing device or multiple computing devices. In some examples, local computing device 110 can be part of and/or include an electronic device (or devices) such as a computer system (e.g., a server, a laptop computer, a tablet computer, etc.), a camera system (e.g., a digital camera, an IP camera, a video camera, a security camera, etc.), a telephone system (e.g., a smartphone, a cellular telephone, a conferencing system, etc.), a display device, an XR device such as a head-mounted display (HMD), an IoT (Internet-of-Things) device, or any other suitable electronic device(s).

Further, the components shown in FIG. 2 with respect to local computing device 110 are illustrative examples provided for explanation purposes. In other examples, local computing device 110 can include more or less components than those shown in FIG. 2.

While local computing device 110 is shown to include certain components, one of ordinary skill will appreciate that local computing device 110 can include more or fewer components than those shown in FIG. 2. For example, local computing device 110 can include, in some instances, one or more memory devices (e.g., RAM, ROM, cache, and/or the like), one or more networking interfaces (e.g., wired and/or wireless communications interfaces and the like), one or more display devices, caches, storage devices, and/or other hardware or processing devices that are not shown in FIG. 2. An illustrative example of a computing device and/or hardware components that can be implemented with local computing device 110 are described below with respect to FIG. 11.

Figure 3:
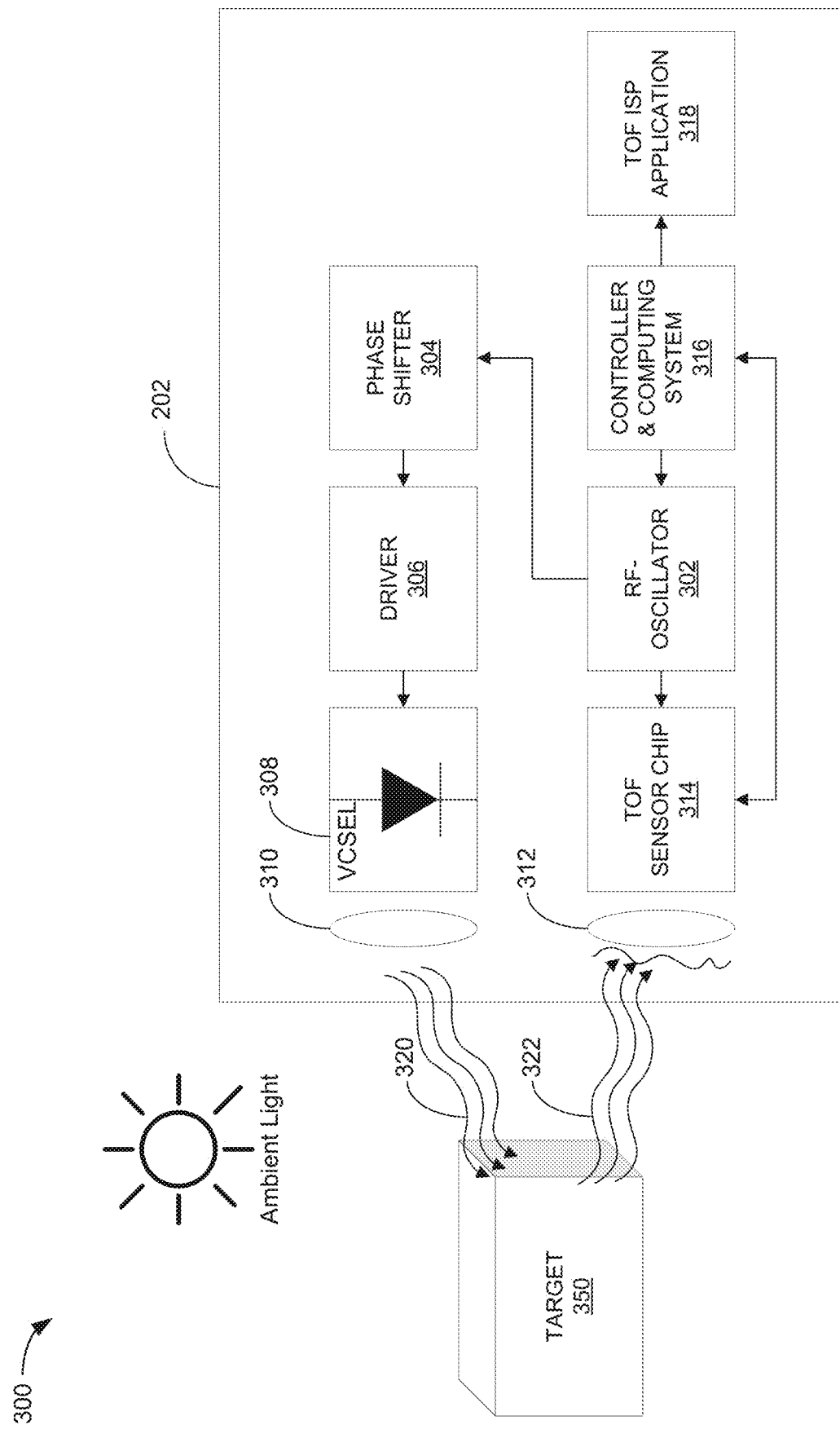
FIG. 3 is a block diagram illustrating an example imaging environment with a Time-of-Flight (ToF) camera system, in accordance with some examples of the present disclosure.

FIG. 3 illustrates an example imaging environment 300 with a three-dimensional (3D) camera system. In this example, the 3D camera system is ToF camera 202 (also referred to as a ToF sensor or ToF camera sensor) described above with respect to FIG. 2. In some examples, ToF camera 202 can be used to implement the systems and techniques described herein. For example, ToF camera 202 can include a range imaging camera system that resolves distance based on the speed of light, a measured time-of-flight of a light signal between the camera and target in the scene for each point of a captured frame.

As explained previously, ToF camera 202 can work by illuminating a scene with a transmitted light 320 (e.g., transmitted signal, modulated output/signal, incident light, or emitted light/signal) and observing (e.g., receiving, capturing or recording, sensing, measuring, analyzing, etc.) a received light 322 (e.g., received signal, backscattered light/signal, or reflected signal/light) that is backscattered (e.g., reflected) by target 350. In the illustrative example of FIG. 3, ToF camera 202 can include a local oscillator clock 302 (e.g., radio frequency (RF) oscillator), a phase shifter 304 at a transmission channel, a driver 306, a light source 308, and a transmit optical system 310.

In some cases, local oscillator clock 302 can include any applicable type of oscillator clock, otherwise referred to as a radio frequency (RF)-oscillator clock. Local oscillator clock 302 can generate a clock signal that can be used to modulate an output signal of ToF camera 202 (e.g., transmitted light 320) and/or to demodulate the ToF pixels on the sensor array (ToF sensor chip 314). In some aspects, phase shifter 304 can receive the clock signal generated by local oscillator clock 302 and delay it for purposes of creating a phase adjusted input. While phase shifter 304 is shown as being implemented on the transmitting channel, in various examples, phase shifter 304 can be implemented in the receiving channel of ToF camera 202. For example, phase shifter 304 can be implemented in the receiving channel to affect modulation of the signal generated by light source 308. In another example, phase shifter 304 can be implemented between ToF sensor chip 314 and local oscillator clock 302 or directly integrated with the ToF sensor chip 314.

In some examples, driver 306 can receive the phase adjusted clock signal from phase shifter 304 and modulate the signal based on the phase adjusted clock signal to generate modulated output (e.g., transmitted light 320) from light source 308. In some examples, the illumination of ToF camera 202 can be generated by light source 308. Light source 308 can include, for example and without limitation, a solid-state laser (e.g., a laser diode (LD), a vertical-cavity surface-emitting laser (VCSEL), etc.), a light-emitting diode (LED), etc.), a lamp, and/or any other light emitter or light emitting device.

In some aspects, transmitted light 320 (e.g., modulated output from light source 308) can pass through transmit optical system 310 and be transmitted towards a target 350 in a scene. In some cases, target 350 can include any type of target, surface, interface, and/or object such as, for example and without limitation, a human, an animal, a vehicle, a tree, a structure (e.g., a building, a wall, a shelter such as a bus stop shelter, etc.), an object, a surface, a device, a material with a refractive index that allows at least some light (e.g., transmitted light 320, ambient light, etc.) to be reflected/backscattered from the material, and/or any other target, surface, interface, and/or object in a scene.

In the illustrative example of FIG. 3, ToF camera 202 includes a receiving optical system 312, a ToF sensor chip 314, and a controller and computing system 316 supporting an application 318. In the example environment 300, when transmitted light 320 (e.g., an RF modulated infrared (IR) optical signal with an equal wave front) interacts with target 350, at least some of transmitted light 320 can be reflected back towards ToF camera 202 as a received light 322 (e.g., backscattered signal, light incident on ToF camera 202, etc.).

In some examples, received light 322 passes through receiving optical system 312 to ToF sensor chip 314. In some cases, received light 322 can include the RF modulated IR optical signal backscattered with different time-of-flight delays. The different ToF delays in received light 322 can represent, or otherwise encode, 3D information of target 350. As used herein, 3D information of a target can include applicable information defining characteristics of a target in 3D space. For example, 3D information of a target can include range information that describes a distance between a reference and the target or a portion of the target.

In some examples, the light that is received by and/or enters (e.g., the light incident on) receiving optical system 312 and/or ToF sensor chip 314 can include a reflected component. In other examples, the light that is received by and/or enters (e.g., the light incident on) entering receiving optical system 312 and/or ToF sensor chip 314 can include a reflected component as well as an ambient component. In some examples, the distance (e.g., depth) information may be embedded in, measured from, and/or defined by the reflected component or may only be embedded in the reflected component. As such, a certain amount of (and/or any amount of) an ambient component can reduce the signal-to-noise ratio (SNR).

In some examples, ToF depth image processing methods can include collecting correlation samples (CSs) to calculate a phase estimate. For example, correlation samples of a ToF pixel and/or image can be collected at one or more time points, such as sequential time points, and at different phase shift/offset conditions. The signal strength of the correlation samples varies with the different phase shifts. As such, these samples output from the ToF pixel and/or image have different values.

In some cases, ToF sensor chip 314 can detect varying ToF delays in received light 322. As follows, ToF sensor chip 314 can communicate with controller and computing system 316 to process the ToF delays and generate 3D information based on the ToF delays.

In some aspects, controller and computing system 316 support application 318 that performs further signal processing and controls various functional aspects, for example, based on the 3D information. For example, application 318 can control or facilitate control of an AV (e.g., AV 102 as illustrated in FIG. 1) based on the 3D information.

As explained, the light from a modulated light source (e.g., transmitted light 320) is backscattered by target 350 in the field of view of ToF camera 202, and the phase shift between transmitted light 320 and received light 322 can be measured. By measuring the phase shift at multiple modulation frequencies, a depth value for each pixel can be calculated. In one illustrative example, based on a continuous-wave (CW) method, ToF camera 202 can take multiple samples per measurement, e.g., with each sample phase-stepped by, e.g., 90 degrees, for a total of four samples (however, the present technology is not limited to 4 phased-stepped implementation). Using this technique, ToF camera 202 can calculate the phase angle between illumination and reflection and the distance associated with target 350. In some cases, a reflected amplitude (A) and an offset (B) can have an impact on the depth measurement precision or accuracy. Moreover, ToF camera 202 can approximate the depth measurement variance. In some cases, the reflected amplitude (A) can be a function of the optical power, and the offset (B) can be a function of the ambient light and residual system offset.

When received light 322 arrives at a ToF sensor of ToF camera 202 (e.g., through a lens of ToF camera 202), each pixel of the ToF sensor demodulates the RF-modulated light 322 generated by electrons and concurrently integrates the photogenerated charges in pixel capacitors at multiple phase shift steps or phase offsets at multiple phase windows. In this way, ToF camera 202 can acquire a set of raw ToF data. ToF camera 202 can then process the raw ToF data. For example, ToF camera 202 can demodulate the time-of-flight and use the time-of-flight to calculate the distance from ToF camera 202 to target 350. In some cases, ToF camera 202 can also generate an amplitude image of active light (A) and a grayscale image of passive light or offset part (B) of the active light.

In some examples, the distance demodulation can establish the basis for estimating depth by ToF camera 202. In some cases, there can be multiple capacitors and multiple integral windows with a phase difference 1L under each pixel of the ToF sensor of ToF camera 202. In one sampling period, the pixel can be designed with electronics and capacitors that can process and accumulate the differential charge or samples. This process is called differential correlation sampling (DCS), and may be used as a method to cancel or minimize the offset (B) from the correlation results. In an example implementation of a 4-DCS method, the capacitors can sample a signal four times at four phases such as 0°, 90°, 180° and 270° phases. ToF camera 202 can use the sample results (e.g., DCS1, DCS2, DCS3, DCS4 sampled at different phase shifts between transmitted light 320 and received light 322 to calculate the distance of target 350 (relative to the ToF camera 202) based on the phase shift.

Equation (1) below provides an example for calculating DCS (e.g., under approximately ideal conditions), in which $DCS_k$ corresponds to the signal used for distance evaluation for k=0, 1, 2, 3; A corresponds to the ToF amplitude; $\varphi_d$ corresponds to the phase of the signal; and $\psi_k$ corresponds to the phase of f sets (e.g., 0°, 90°, 1800 and 270°).

$$DCS_k = A \cdot \cos(\varphi_d - \psi_k); k = 0, 1, 2, 3 \qquad (1)$$

In some examples, ToF camera 202 can measure a distance for every pixel to generate a depth map. In some cases, a depth map can include a collection of 3D points (e.g., each point is also known as a voxel). In some cases, the depth map can be rendered in a two-dimensional (2D) representation or image. In other cases, a depth map can be rendered in a 3D space as a collection of points or point cloud. In some examples, the 3D points can be mathematically connected to form a mesh onto which a texture surface can be mapped.

Figure 4:
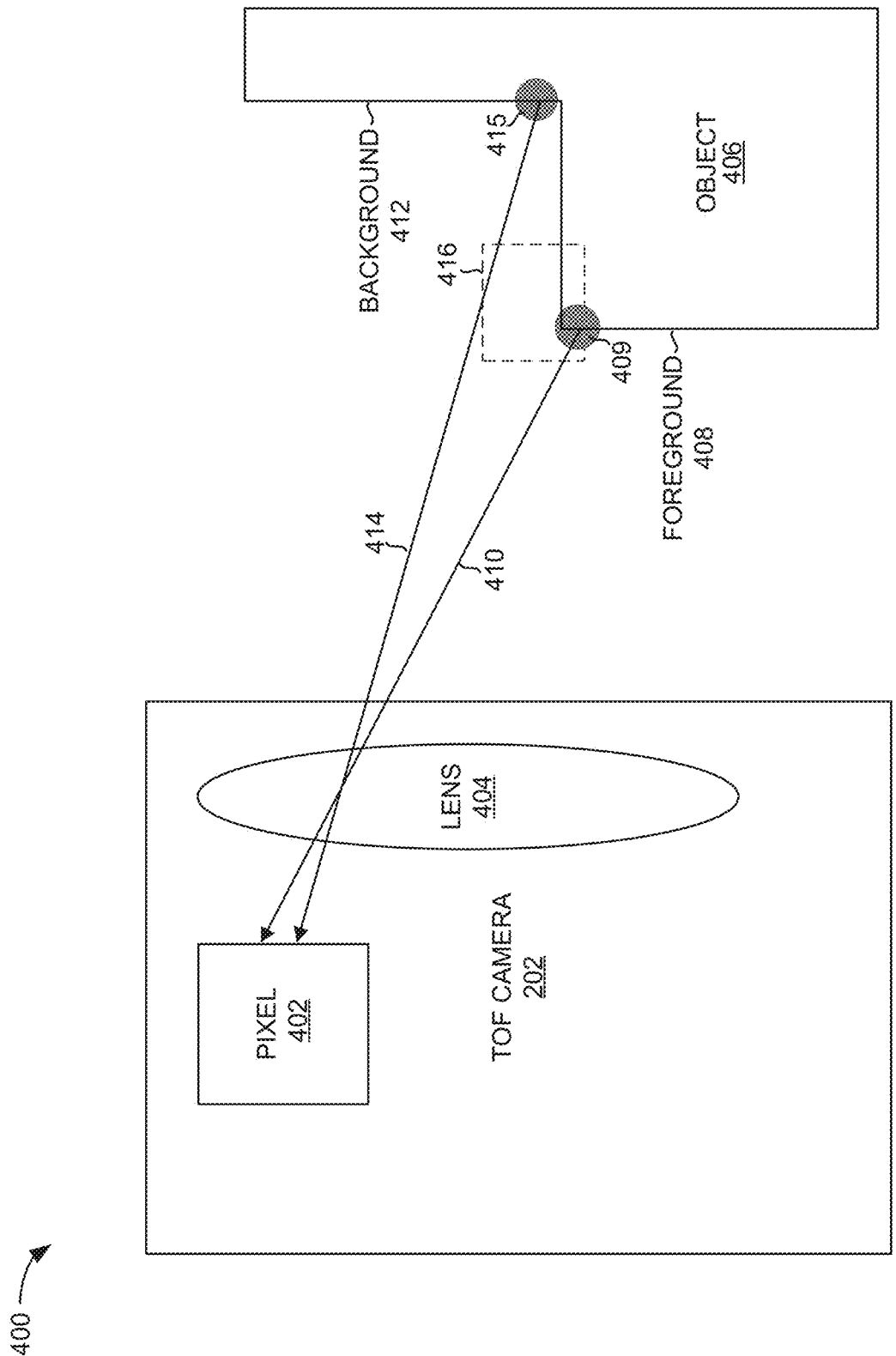
FIG. 4 is a block diagram illustrating another example imaging environment with a ToF camera system, in accordance with some examples of the present disclosure.

FIG. 4 illustrates an example imaging environment 400 with a three-dimensional (3D) camera system. In this example, the 3D camera system is ToF camera 202 (e.g., as described above with respect to FIG. 2 and FIG. 3). In some cases, ToF camera 202 may map an object 406 with a foreground portion 408 and a background portion 412 to a single pixel (e.g., pixel 402). For example, pixel 402 may be mapped to optical paths corresponding to area 416 with the domain of object 406.

As illustrated, volumetric representative point 409 (e.g., part of foreground portion 408) may be along optical path 410 and volumetric representative point 415 (e.g., part of background portion 412) may be along optical path 414. In some aspects, optical path 410 and optical path 414 can both be mapped to pixel 402 via camera lens 404. In one illustrative example, ToF camera 202 may have a resolution of 320×240 pixels with a horizontal field of view of 76 degrees, and area 416 can be 2.44×2.44 (cm²) at a distance of 5 m.

In some cases, the phase and/or distance measurement obtained from pixel 402 can extend from foreground portion 408 to background portion 412. In some aspects, the phase and/or distance measurement obtained from pixel 402 may extend away from either foreground portion 408 or background portion 412. Consequently, in some examples, pixel 402 may be referred to as an edge pixel, a flying pixel, and/or a floating pixel.

Figure 5A:
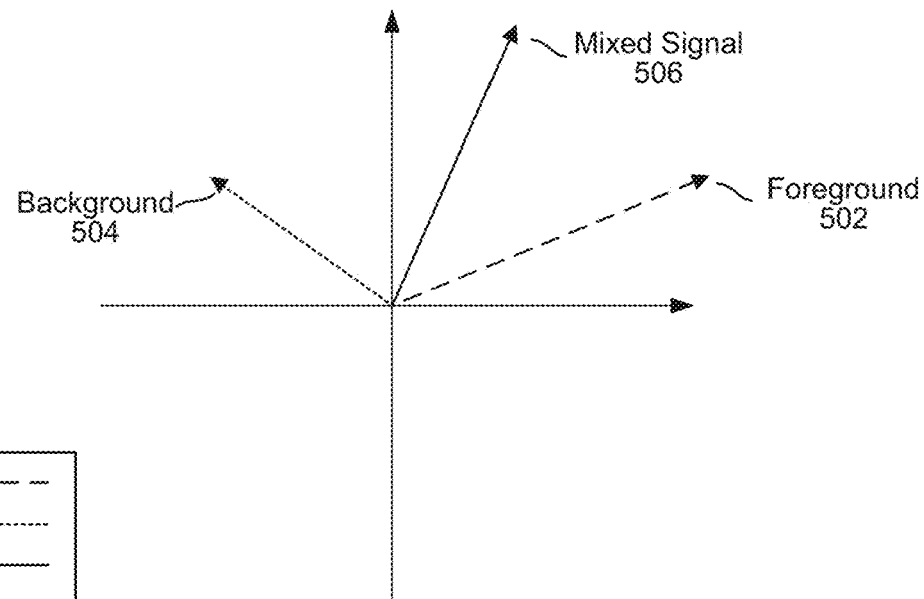
FIG. 5A, FIG. 5B, FIG. 5C, and FIG. 5D are graphs illustrating examples signals that may be received by a pixel of a ToF sensor, in accordance with some examples of the present disclosure.

FIG. 5A is a graph 500 illustrating an example formation of an edge pixel. As illustrated, foreground vector 502 may correspond to optical path 410 and background vector 504 may correspond to optical path 414. In some aspects, mixed signal vector 506 (e.g., combination of foreground vector 502 and background vector 504) can correspond to an edge pixel having a phase that is between foreground vector 502 and background vector 504.

Figure 5B:
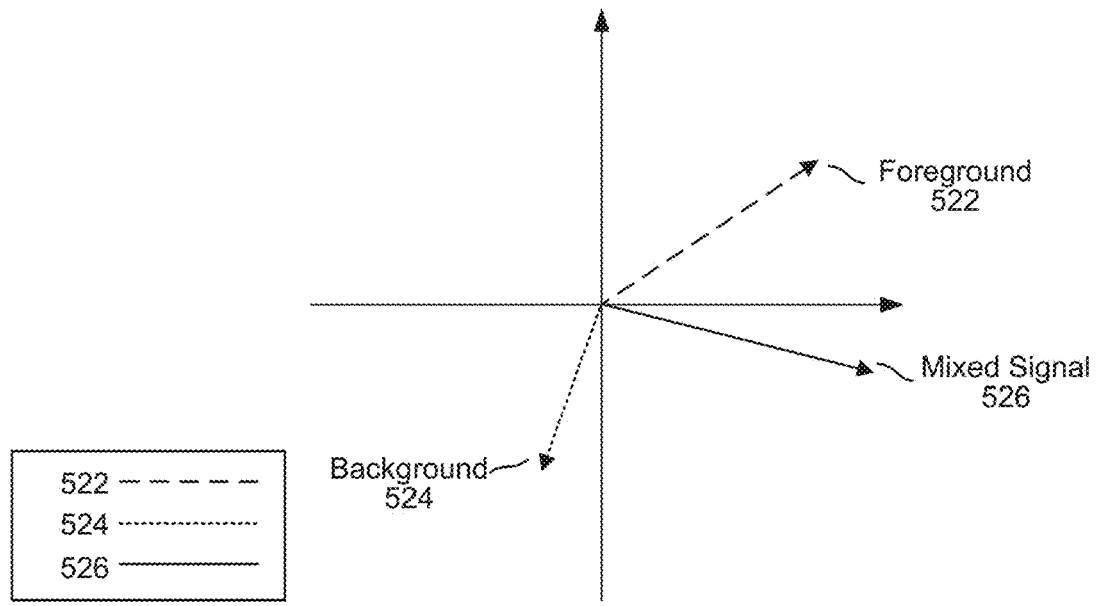

FIG. 5B is a graph 520 illustrating an example formation of a floating edge pixel. As illustrated, foreground vector 522 may correspond to optical path 410 and background vector 524 may correspond to optical path 414. In some aspects, mixed signal vector 526 (e.g., combination of foreground vector 522 and background vector 524) can correspond to a floating edge pixel having a phase that is larger than background vector 524. That is, the pixel corresponding to mixed signal vector 526 can be floating behind object 406 (e.g., at wrong x, y location).

Figure 5C:
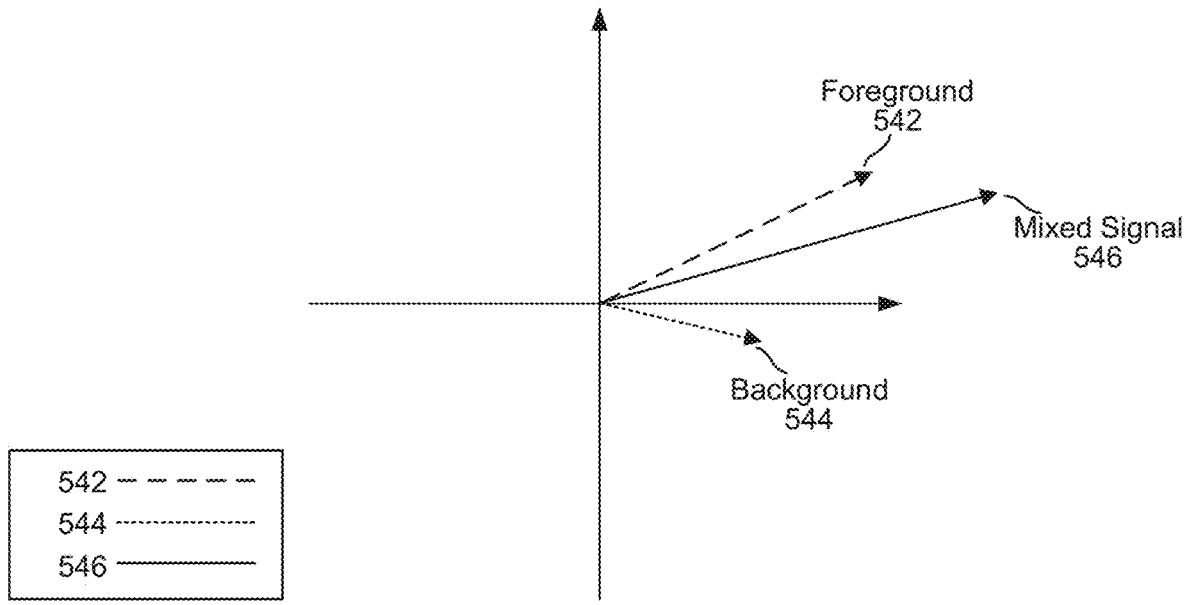

FIG. 5C is a graph 540 illustrating an example formation of a floating edge pixel. As illustrated, foreground vector 542 may correspond to optical path 410 and background vector 544 may correspond to optical path 414. In some aspects, mixed signal vector 546 (e.g., combination of foreground vector 542 and background vector 544) can correspond to a floating edge pixel having a phase that is smaller than the phase of foreground vector 542. That is, the pixel corresponding to mixed signal vector 546 can be floating in front of object 406 (e.g., at wrong x, y location).

Figure 5D:
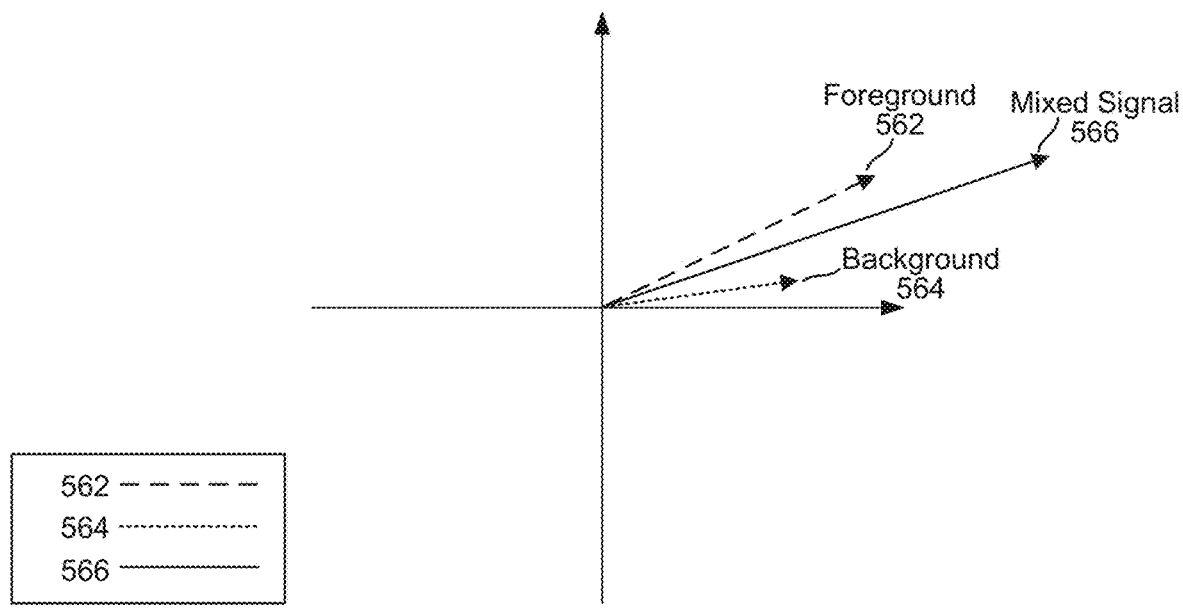

FIG. 5D is a graph 560 illustrating an example formation of a floating edge pixel. As illustrated, foreground vector 562 may correspond to optical path 410 and background vector 564 may correspond to optical path 414. In some aspects, mixed signal vector 566 (e.g., combination of foreground vector 562 and background vector 564) can correspond to a floating edge pixel having a phase that is smaller or larger than the phase of foreground vector 542. That is, the background vector 564 may have wrapped around (e.g., phase greater than 360 degrees) and the pixel corresponding to mixed signal vector 566 can be floating in front of object 406 (e.g., at wrong x, y location).

Returning to FIG. 4, in some aspects, ToF camera 202 may calculate DCS in a manner that accounts for mixed signals (e.g., reflections from foreground objects and background objects that are received by the same pixel). For example, Equation (1) above can be rewritten to account for mixed signals by including terms that are associated with the foreground vector and terms that are associated with the background vector. That is, in the case of a mixed signal, Equation (1) can be modified to yield Equation (2) below, in which the terms indexed with '0' correspond to foreground and the terms indexed with '1' correspond to background, as follows:

$$DCS_k = A_0 \cdot \cos(\varphi_{d0} - \psi_k) + A_1 \cdot \cos(\varphi_{d1} - \psi_k); k = 0, 1, 2, 3 \quad (2)$$

In some examples, Equation (2) can be re-written to a form that can be used to illustrate the quantitative contribution or impact of the background signal to the amplitude and phase calculations. For instance, Equation (2) can be rewritten in the form expressed by Equation (3), as follows:

$$DCS_k = \sqrt{A_0^2 + 2A_0 A_1 \cos(\varphi_{d1} - \varphi_{d0}) + A_1^2} \quad (3)$$
$$\cos\left(\left(\varphi_{d6} - \psi_k + \operatorname{atan}\left(\frac{A_1 \sin(\varphi_{d1} - \varphi_{d0})}{A_0 + A_1 \cos(\varphi_{d3} - \varphi_{d0})}\right)\right)\right) k = 0, 1, 2, 3$$

In some cases, ToF camera 202 may be configured to identify one or more edge pixels (e.g., pixels that are receiving a mixed signal due to foreground and background contributions). In some cases, ToF camera 202 can generate an edge filter mask that can be used to remove the measurements associated with edge pixels (e.g., pixels that are associated with a mixed signal can be discarded from 3D point cloud).

Figure 6:
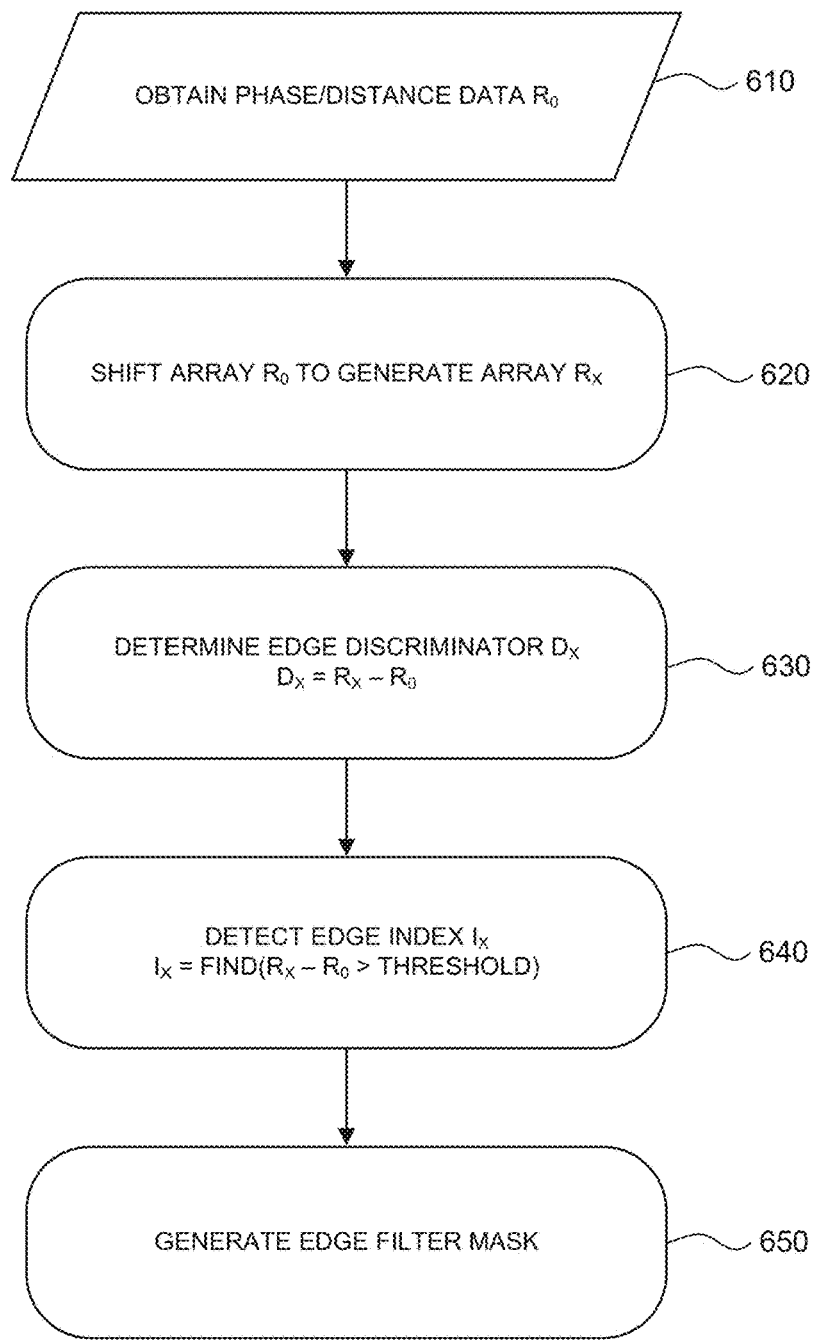
FIG. 6 is a flowchart illustrating an example process for determining an edge filter mask, in accordance with some examples of the present disclosure.

FIG. 6 is a flowchart 600 illustrating an example process for determining an edge filter mask. At step 610, the process 600 can include obtaining data from a pixel array of a ToF sensor. In some cases, the data can include depth information and/or phase information (e.g., radian phase/distance). In some aspects, the phase/distance data can be represented by an array $R_0$.

At step 620, the process 600 can include shifting the array $R_0$ to generate one or more new arrays $R_X$ (e.g., array $R_1$, $R_2$, $R_3$ ... ). In some cases, the shift can correspond to an upward row shift, a downward row shift, a leftward column shift, a rightward column shift, and/or a diagonal shift. In some examples, the shift may include a single row or column while in other examples the shift may include multiple rows and/or columns.

Figure 7A:
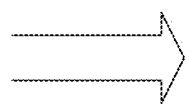
FIG. 7A, FIG. 7B, FIG. 7C, FIG. 7D, and FIG. 7E illustrate examples of depth data shifts that may be performed for determining an edge filter mask, in accordance with some examples of the present disclosure.

FIG. 7A illustrates an example of an upward row shift 700. As illustrated, the data from a pixel array represented by $R_0$ 702 is shifted upward by a row to yield $R_X$ 704. For example, the data associated with pixels from $R_0$ 702, row 2 may be shifted upward and correspond to $R_X$ 704, row 1. In some cases, the empty row in $R_X$ 704 (e.g., row 5) can be padded with values from row 5 in $R_0$ 702, with zeros, or with any other values.

Figure 7B:
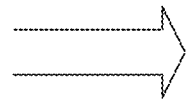

FIG. 7B illustrates an example of a downward row shift 720. As illustrated, the data from a pixel array represented by $R_0$ 702 is shifted downward by a row to yield $R_X$ 724. For example, the data associated with pixels from $R_0$ 702, row 1 may be shifted downward and correspond to $R_X$ 724, row 2. In some examples, the empty row in $R_X$ 724 (e.g., row 1) can be padded with the values from row 1 in $R_0$ 702, with zeros, or with any other values.

Figure 7C:
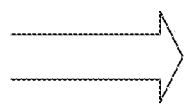

FIG. 7C illustrates an example of a rightward column shift 740. As illustrated, the data from a pixel array represented by $R_0$ 702 is shifted rightward by a column to yield $R_X$ 744. For example, the data associated with pixels from $R_0$ 702, column 1 may be shifted rightward and correspond to $R_X$ 744, column 2. In some cases, the empty column in $R_X$ 744 (e.g., column 1) can be padded with the values from column 1 in $R_0$ 702, with zeros, or with any other values.

Figure 7D:
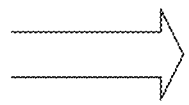

FIG. 7D illustrates an example of a leftward column shift 760. As illustrated, the data from a pixel array represented by $R_0$ 702 is shifted leftward by a column to yield $R_X$ 764. For example, the data associated with pixels from $R_0$ 702, column 2 may be shifted leftward and correspond to $R_X$ 764, column 1. In some aspects, the empty column in $R_X$ 764 (e.g., column 5) can be padded with the values from column 5 in $R_0$ 702, with zeros, or with any other values.

Figure 7E:
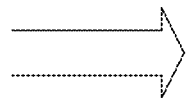

FIG. 7E illustrates an example of a diagonal shift 780. As illustrated, the data from a pixel array represented by $R_0$ 702 is shifted diagonally (e.g., one row down and one column to the right) to yield $R_X$ 784. For example, data associated with pixel from $R_0$, row 1, column 1 may be shifted diagonally and correspond to $R_X$ 784, row 2, column 2. In some examples, the empty row (e.g., row 1) and the empty column (e.g., column 1) in $R_X$ 784 can be padded with the values from row 1 and column 1, respectively, from $R_0$ 702 or with zeros or with any other values.

Returning to FIG. 6, at step 630, the process 600 may include determining one or more edge discriminators $D_X$ (e.g., $D_1, D_2, D_3$ ... ). In some aspects, an edge discriminator $D_X$ may be determined by finding the difference between $R_0$ and $R_X$. For example, a first edge discriminator $D_1$ may be $R_X$ 704–$R_0$ 702. In another example, a second edge discriminator $D_2$ may be $R_X$ 724–$R_0$ 702. In another example, a third edge discriminator $D_3$ may be $R_X$ 744–$R_0$ 702. In another example, a fourth edge discriminator $D_4$ may be $R_X$ 764–$R_0$ 702. In another example, a fifth edge discriminator $D_5$ may be $R_X$ 784–$R_0$ 702.

At step 640, the process 600 can include detecting one or more edge indexes $I_X$ (e.g., $I_1, I_2, I_3$ ... ). In some examples, an edge index may be based on the value of the edge discriminator. For example, the edge index may be detected when the value of $D_X$ is greater than a threshold value. In some aspects, the threshold value may be a constant (e.g., C0) that can be applied to all pixels in the pixel array (e.g., not adaptive). In one illustrative example, the threshold value may be 5 cm (e.g., $D_X$ is greater than 5 cm). In another illustrative example, the threshold value may be 10 cm (e.g., $D_X$ is greater than 10 cm).

In some aspects, the threshold value for detecting an edge index may be adaptive. That is, the threshold value may be determined by a function that is adaptive for each pixel on the ToF sensor based on array location (e.g., at coordinates (i, j)). In some examples, the adaptive function for determining the threshold ("ThrEde") may be based on parameters that can include one or more of a distance or related phase of the object (e.g., $D_{ToF}$ (i, j)); the active light of the sensor reflected from the object (e.g., $A_{ToF}$ (i, j)); the grayscale of the environmental light reflected from the object (e.g., GS (i, j)); and/or one or more constants for adjusting filter adaptivity (e.g., C0, C1, C2 . . . ).

In one illustrative example, the adaptive function for determining the threshold may be given by Equation (4), in which the threshold value is adaptive to the local distance, as follows:

$$C1^{*}Dtof(i, j) \tag{4}$$

In another illustrative example, the adaptive function for determining the threshold may be given by Equation (5), in which the threshold value is adaptive to the local signal strength (e.g., shot noise adaptive), as follows:

$$C2./sqrt(Atof(i, j)) \tag{5}$$

In another illustrative example, the adaptive function for determining the threshold may be given by Equation (6), in which the threshold value is adaptive to the local signal amplitude, as follows:

$$C3./Atof(i, j) \tag{6}$$

In another illustrative example, the adaptive function for determining the threshold may be given by Equation (7), in which the threshold value is adaptive to the local signal strength (e.g., overall system noise adaptive; proportional to the signal-to-noise (SNR) ratio), as follows:

$$C4^{*}sqrt(C5^{*}Atof(i, j) + C6^{*}GS(i, j) + C7)./Atof(i, j) \tag{7}$$

In another illustrative example, the adaptive function for determining the threshold may be given by Equation (8), in which the threshold value is adaptive and weighted by Equation (4) and Equation (7) (e.g., threshold is proportional to weighted $D_{ToF}$ and SNR), as follows:

$$C8^{*}Dtof(i, j) + \tag{8}$$
$$C9^{*}sqrt(C5^{*}Atof(i, j) + C6^{*}Grascle(i, j) + C7)./Atof(i, j)$$

In another illustrative example, the adaptive function for determining the threshold may be given by Equation (9), in which the threshold value is adaptive and modified by Equation (4) and Equation (7) (e.g., threshold is proportional to product of $D_{ToF}$ and SNR), as follows:

$$C10^{*}Dtof(i, j).^{*}sqrt(C5^{*}Atof(i, j) + C6^{*}Grascle(i, lj) + C7)./Atof(i, j) \tag{9}$$

At step 650, the process 600 can include generating an edge filter mask. In some cases, the edge filter mask can be used to remove data associated with edge pixels from a 3D point cloud.

Figure 8B:
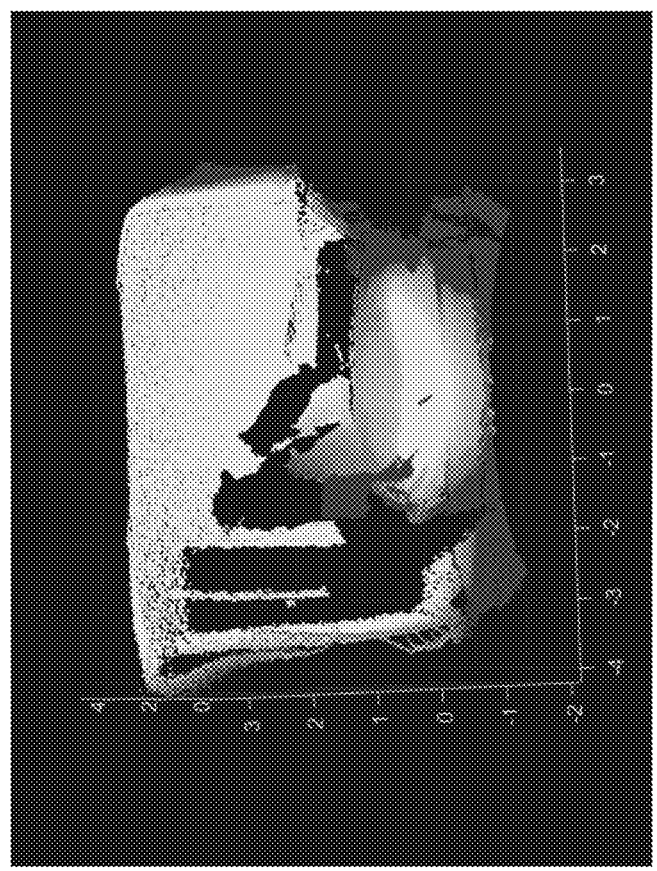
FIG. 8B illustrates an example of a point cloud after applying an edge filter mask, in accordance with some examples of the present disclosure.
Figure 8A:
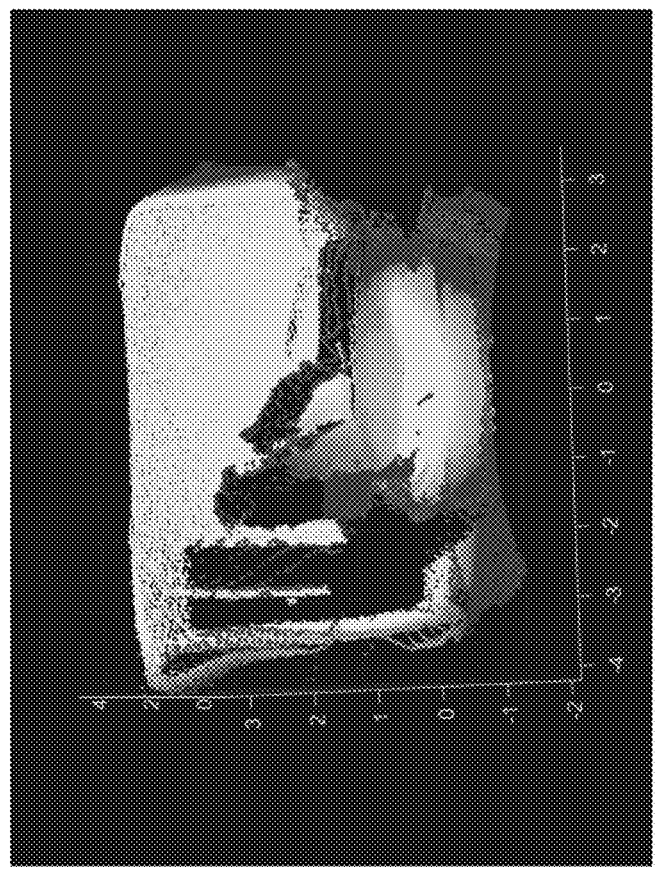
FIG. 8A illustrates an example of a point cloud prior to applying an edge filter mask, in accordance with some examples of the present disclosure.

FIG. 8A illustrates an example of a point cloud 800 that includes edge pixels that have been identified (e.g., based on edge index $I_x$). FIG. 8B illustrates an example of a point cloud after applying an edge filter mask to remove edge pixels (e.g., based on step 650 of process 600).

Figure 9:
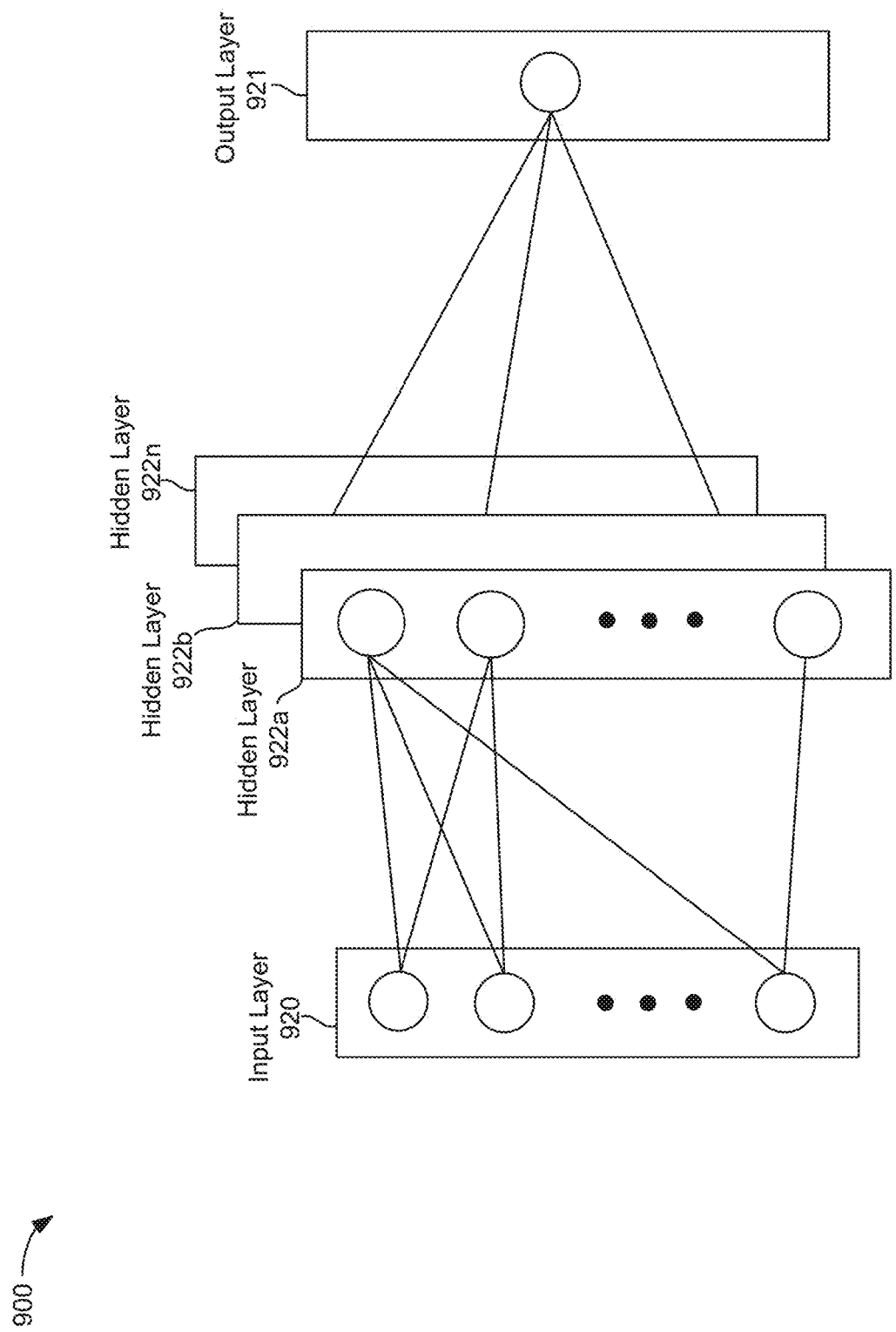
FIG. 9 illustrates an example of a deep learning neural network that can be used to implement aspects of an AV fleet management system or an AV, according to some aspects of the present disclosure.

In FIG. 9, the disclosure now turns to a further discussion of models that can be used through the environments and techniques described herein. FIG. 9 is an example of a deep learning neural network 900 that can be used to implement all, or a portion of the systems and techniques described herein as discussed above (e.g., neural network 900 can be used to implement aspects of ToF camera 202). For example, an input layer 920 can be configured to receive one or more measurements or parameters associated with a ToF sensor such as distance, phase, active light, grayscale of the environmental light, etc. Neural network 900 includes multiple hidden layers 922a, 922b, through 922n. The hidden layers 922a, 922b, through 922n include "n" number of hidden layers, where "n" is an integer greater than or equal to one. The number of hidden layers can be made to include as many layers as needed for the given application. Neural network 900 further includes an output layer 921 that provides an output resulting from the processing performed by the hidden layers 922a, 922b, through 922n. For instance, the output may include an adaptive function that can be used to determine an adaptive threshold for identifying an edge pixel (e.g., finding edge index $I_x$).

Neural network 900 is a multi-layer neural network of interconnected nodes. Each node can represent a piece of information. Information associated with the nodes is shared among the different layers and each layer retains information as information is processed. In some cases, the neural network 900 can include a feed-forward network, in which case there are no feedback connections where outputs of the network are fed back into itself. In some cases, the neural network 900 can include a recurrent neural network, which can have loops that allow information to be carried across nodes while reading in input.

Information can be exchanged between nodes through node-to-node interconnections between the various layers. Nodes of the input layer 920 can activate a set of nodes in the first hidden layer 922a. For example, as shown, each of the input nodes of the input layer 920 is connected to each of the nodes of the first hidden layer 922a. The nodes of the first hidden layer 922a can transform the information of each input node by applying activation functions to the input node information. The information derived from the transformation can then be passed to and can activate the nodes of the next hidden layer 922b, which can perform their own designated functions. Example functions include convolutional, up-sampling, data transformation, and/or any other suitable functions. The output of the hidden layer 922b can then activate nodes of the next hidden layer, and so on. The output of the last hidden layer 922n can activate one or more nodes of the output layer 921, at which an output is provided. In some cases, while nodes in the neural network 900 are shown as having multiple output lines, a node can have a single output and all lines shown as being output from a node represent the same output value.

In some cases, each node or interconnection between nodes can have a weight that is a set of parameters derived from the training of the neural network 900. Once the neural network 900 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 920 using the different hidden layers 922a, 922b, through 922n in order to provide the output through the output layer 921.

In some cases, the neural network 900 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 900 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total=\Sigma(\frac{1}{2}(target-output)^2)$. The loss can be set to be equal to the value of $E\_total$.

The loss (or error) will be high for the initial training data since the actual values will be much different than the predicted output. The goal of training is to minimize the amount of loss so that the predicted output is the same as the training output. The neural network 900 can perform a backward pass by determining which inputs (weights) most contributed to the loss of the network and can adjust the weights so that the loss decreases and is eventually minimized.

The neural network 900 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 900 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 10:
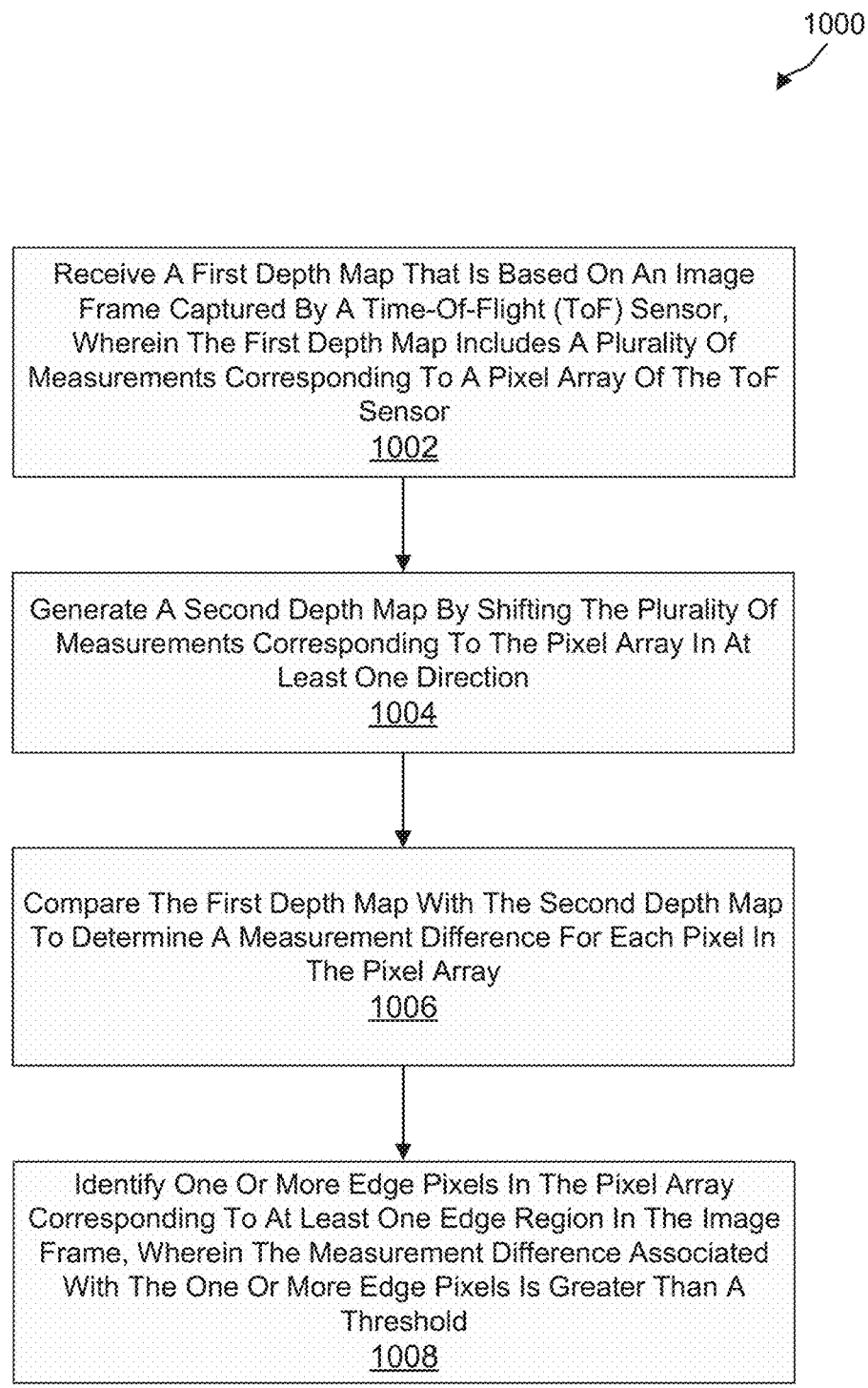
FIG. 10 is a flowchart illustrating an example process for determining an edge filter mask, in accordance with some examples of the present disclosure.

FIG. 10 illustrates an example of a process 1000 for identifying edge pixels based on measurements obtained from a ToF sensor. At block 1002, the process 1000 includes receiving a first depth map that is based on an image frame captured by a time-of-flight (ToF) sensor, wherein the first depth map includes a plurality of measurements corresponding to a pixel array of the ToF sensor. For example, ToF camera 202 (e.g., ToF ISP application 318) may receive a first depth map that is based on an image frame captured by ToF camera 202.

At block 1004, the process 1000 includes generating a second depth map by shifting the plurality of measurements corresponding to the pixel array in at least one direction. In some examples, shifting the plurality of measurements corresponding to the pixel array in at least one direction can include at least one of an upward row shift, a downward row shift, a leftward column shift, a rightward column shift, and a diagonal shift. For example, ToF camera 202 may generate a second depth by performing a shift (e.g., according to FIG. 7A, FIG. 7B, FIG. 7C, FIG. 7D, and/or FIG. 7E).

At block 1006, the process 1000 includes comparing the first depth map with the second depth map to determine a measurement difference for each pixel in the pixel array. For instance, ToF camera 202 may compare $R_O$ with $R_X$ to determine a measurement difference.

In some aspects, comparing the first depth map with the second depth map can include comparing the first depth map with a first version of the second depth map, wherein the first version of the second depth map corresponds to the upward shift; comparing the first depth map with a second version of the second depth map, wherein the second version of the second depth map corresponds to the downward shift; comparing the first depth map with a third version of the second depth map, wherein the third version of the second depth map corresponds to the leftward column shift; and comparing the first depth map with a fourth version of the second depth map, wherein the fourth version of the second depth map corresponds to the rightward column shift.

At block 1008, the process 1000 includes identifying one or more edge pixels in the pixel array corresponding to at least one edge region in the image frame, wherein the measurement difference associated with the one or more edge pixels is greater than a threshold. For example, ToF camera 202 may identify one or more edge pixels corresponding to at least one edge in the image frame based on a threshold (e.g., threshold determined at step 640 of process 600).

In some aspects, the edge threshold is a constant value for each pixel in the pixel array. In some examples, the edge threshold is an adaptive value that is based on a distance measurement associated with each pixel in the pixel array. In one illustrative example, the edge threshold that is based on distance measurement can be calculated using Equation (4), as described herein. In some cases, the edge threshold is an adaptive value that is based on a signal strength measurement associated with each pixel in the pixel array. In one illustrative example, the edge threshold that is based on signal strength can be calculated using Equation (5), as described herein. In some instances, the edge threshold is an adaptive value that is based on an amplitude measurement associated with each pixel in the pixel array. In one illustrative example, the edge threshold that is based on amplitude can be calculated using Equation (6), as described herein. In some configurations, the edge threshold is an adaptive value that is based on a signal-to-noise (SNR) ratio associated with each pixel in the pixel array. In one illustrative example, the edge threshold that is based on SNR can be calculated using Equation (7), as described herein.

In some aspects, the process 1000 can include removing a portion of the plurality of measurements corresponding to the one or more edge pixels. For example, ToF camera 202 can remove a portion of the plurality of measurements corresponding to edge pixels such as edge pixel 402. In some examples, removing measurements corresponding to edge pixels can remove noise from an image (e.g., see difference between point cloud 800 that includes edge pixels and point cloud 850 in which an edge filter mask has been applied).

Figure 11:
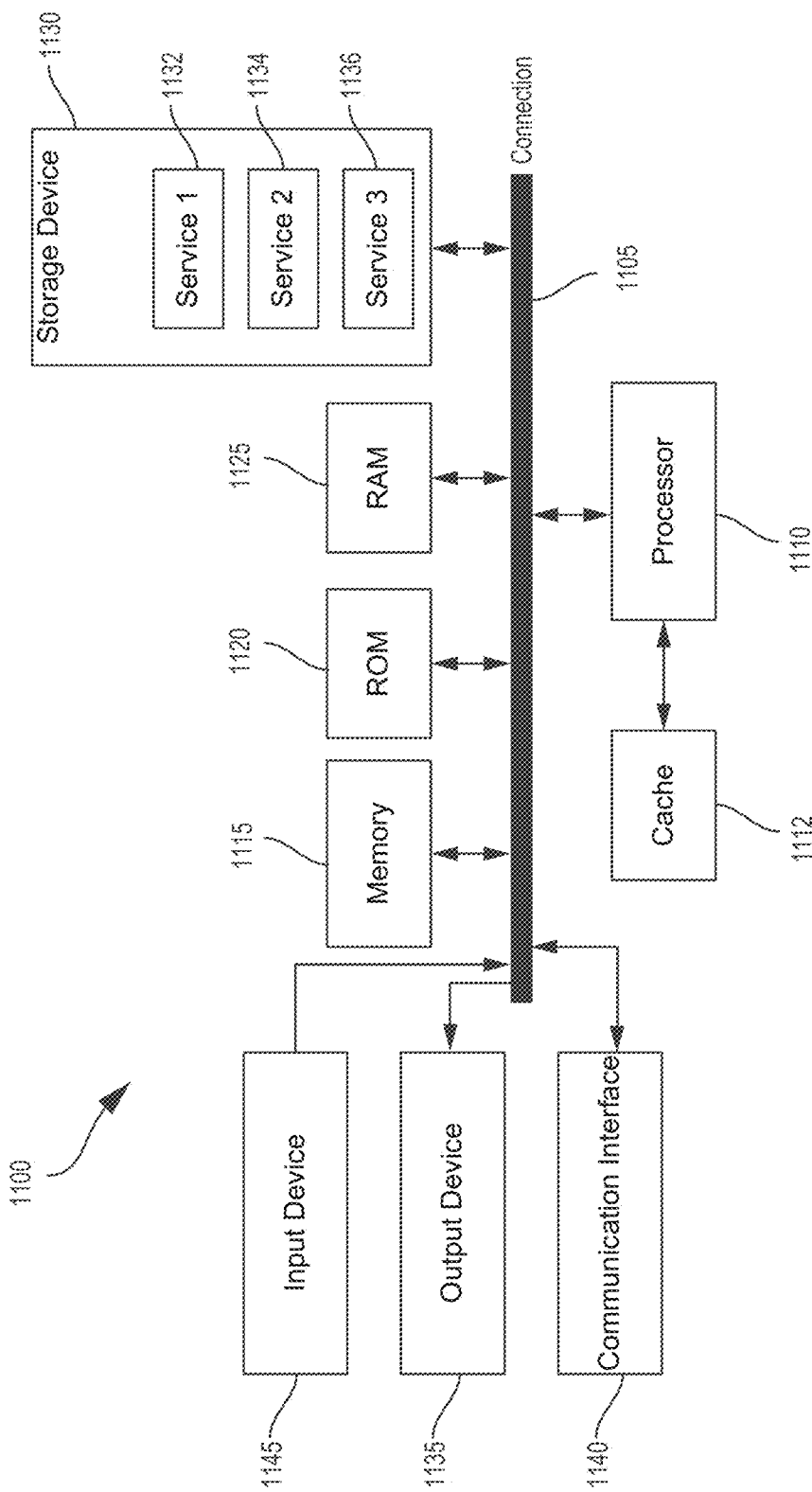
FIG. 11 is a diagram illustrating an example system architecture for implementing certain aspects described herein.

FIG. 11 illustrates an example processor-based system with which some aspects of the subject technology can be implemented. For example, processor-based system 1100 can be any computing device making up internal computing system 110, a passenger device executing the ridehailing application 172, or any component thereof in which the components of the system are in communication with each other using connection 1105. Connection 1105 can be a physical connection via a bus, or a direct connection into processor 1110, such as in a chipset architecture. Connection 1105 can also be a virtual connection, networked connection, or logical connection.

In some examples, computing system 1100 is a distributed system in which the functions described in this disclosure can be distributed within a datacenter, multiple data centers, a peer network, etc. In some cases, one or more of the described system components represents many such components each performing some or all of the function for which the component is described. In some aspects, the components can be physical or virtual devices.

Example system 1100 includes at least one processing unit (CPU or processor) 1110 and connection 1105 that couples various system components including system memory 1115, such as read-only memory (ROM) 1120 and random-access memory (RAM) 1125 to processor 1110. Computing system 1100 can include a cache of high-speed memory 1112 connected directly with, in close proximity to, and/or integrated as part of processor 1110.

Processor 1110 can include any general-purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 can include an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms known to those of skill in the art. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 1130 can include software services, servers, services, etc., that when the code that defines such software is executed by the processor 1110, causes the system to perform a function. In some examples, a hardware service that performs a particular function can include the software component stored in a computer-readable medium in connection with the necessary hardware components, such as processor 1110, connection 1105, output device 1135, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

Selected Examples

Illustrative examples of the disclosure include:

Aspect 1. A method comprising: receiving a first depth map that is based on an image frame captured by a time-of-flight (ToF) sensor, wherein the first depth map includes a plurality of measurements corresponding to a pixel array of the ToF sensor; generating a second depth map by shifting the plurality of measurements corresponding to the pixel array in at least one direction; comparing the first depth map with the second depth map to determine a measurement difference for each pixel in the pixel array; and identifying one or more edge pixels in the pixel array corresponding to at least one edge region in the image frame, wherein the measurement difference associated with the one or more edge pixels is greater than an edge threshold.

Aspect 2. The method of Aspect 1, wherein shifting the plurality of measurements corresponding to the pixel array in at least one direction includes at least one an upward row shift, a downward row shift, a leftward column shift, a rightward column shift, and a diagonal shift.

Aspect 3. The method of Aspect 2, wherein comparing the first depth map with the second depth map further comprises: compare the first depth map with a first version of the second depth map, wherein the first version of the second depth map corresponds to the upward row shift; compare the first depth map with a second version of the second depth map, wherein the second version of the second depth map corresponds to the downward row shift; compare the first depth map with a third version of the second depth map, wherein the third version of the second depth map corresponds to the leftward column shift; and compare the first depth map with a fourth version of the second depth map, wherein the fourth version of the second depth map corresponds to the rightward column shift.

Aspect 4. The method of any of Aspects 1 to 3, wherein the edge threshold is a constant value for each pixel in the pixel array.

Aspect 5. The method of any of Aspects 1 to 3, wherein the edge threshold is an adaptive value that is based on a distance measurement associated with each pixel in the pixel array.

Aspect 6. The method of any of Aspects 1 to 3, wherein the edge threshold is an adaptive value that is based on a signal strength measurement associated with each pixel in the pixel array.

Aspect 7. The method of any of Aspects 1 to 3, wherein the edge threshold is an adaptive value that is based on an amplitude measurement associated with each pixel in the pixel array.

Aspect 8. The method of any of Aspects 1 to 3, wherein the edge threshold is an adaptive value that is based on a signal-to-noise (SNR) ratio associated with each pixel in the pixel array.

Aspect 9. The method of any of Aspects 1 to 8, further comprising: removing a portion of the plurality of measurements corresponding to the one or more edge pixels Aspect 10. An apparatus comprising: at least one memory; and at least one processor coupled to the at least one memory, wherein the at least one processor is configured to perform operations in accordance with any one of Aspects 1 to 9.

Aspect 11. An apparatus comprising means for performing operations in accordance with any one of Aspects 1 to 9.

Aspect 12. A non-transitory computer-readable medium comprising instructions that, when executed by an apparatus, cause the apparatus to perform operations in accordance with any one of Aspects 1 to 9.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A system comprising:
   at least one memory comprising instructions;
   at least one processor configured to execute the instructions;
   a time-of-flight (ToF) sensor electrically coupled to the at least one processor, the ToF sensor comprising a light source, a sensor chip having a pixel array, and a controller,
   wherein the instructions are configured to cause the at least one processor to:
   command the ToF sensor controller to generate a plurality of real-time image frames of a scene by emitting modulated light from the light source and receiving reflected light within a field of view of the sensor chip, detecting ToF delays in the reflected light at one or more pixels of the pixel array of the sensor chip, processing the ToF delays to generate depth information for the pixels of the pixel array;
   generate a first depth map of a first image frame of the plurality of real-time image frames, the first depth map having a first array representative of the pixel array of the sensor chip comprising a plurality of three-dimensional (3D) measurements generated by the ToF sensor;
   generate a second depth map having a second array representative of the first image frame comprising the plurality of 3D measurements corresponding to the first array being shifted in at least one direction;
   detect a mixed signal in the reflected light received at the one or more pixels of the pixel array of the sensor chip by comparing the first depth map at least with the second depth map to determine a measurement difference between the 3D measurements stored in the first array and the second array for the pixels in the pixel array;
   identify one or more edge pixels in the pixel array based on the detected mixed signal,
   wherein the measurement difference is associated with the one or more edge pixels, and is greater than an edge threshold;
   remove the 3D measurements corresponding to the one or more edge pixels from the first depth map of the first image frame; and
   repeat the generating of the first and second depth maps, the detecting the mixed signal, the identifying of the one or more edge pixels, and the removing the 3D measurements, for each of the plurality of real-time image frames.

2. The system of claim 1, wherein the plurality of 3D measurements corresponding to the first array are shifted in at least one direction including at least one of an upward row shift, a downward row shift, a leftward column shift, a rightward column shift, and a diagonal shift.

3. The system of claim 2, wherein to compare the first depth map with the second depth map the at least one processor is further configured to:
   compare the first depth map with a first version of the second depth map, wherein the first version of the second depth map corresponds to the upward row shift;
   compare the first depth map with a second version of the second depth map, wherein the second version of the second depth map corresponds to the downward row shift;
   compare the first depth map with a third version of the second depth map, wherein the third version of the second depth map corresponds to the leftward column shift; and
   compare the first depth map with a fourth version of the second depth map, wherein the fourth version of the second depth map corresponds to the rightward column shift.

4. The system of claim 1, wherein the edge threshold is a constant value for each pixel in the pixel array.

5. The system of claim 1, wherein the edge threshold is an adaptive value that is based on a distance measurement associated with each pixel in the pixel array.

6. The system of claim 1, wherein the edge threshold is an adaptive value that is based on a signal strength measurement associated with each pixel in the pixel array.

7. The system of claim 1, wherein the edge threshold is an adaptive value that is based on an amplitude measurement associated with each pixel in the pixel array.

8. The system of claim 1, wherein the edge threshold is an adaptive value that is based on a signal-to-noise (SNR) ratio associated with each pixel in the pixel array.

9. The system of claim 1, wherein the processing of ToF delays further comprises generating phase information.

10. A method comprising:
generating, by a ToF sensor comprising a light source, a sensor chip having a pixel array, and a controller, a plurality of real-time image frames of a scene by emitting modulated light from the light source and receiving reflected light within a field of view of the sensor chip, detecting ToF delays in the reflected light at one or more pixels of the pixel array of the sensor chip, processing the ToF delays to generate depth information for the pixels of the pixel array;
generating a first depth map of a first image frame of the plurality of real-time image frames, the first depth map having a first array representative of the pixel array of the sensor chip comprising a plurality of three-dimensional (3D) measurements generated by the ToF sensor;
generating at least a second depth map having a second array representative of the first image frame comprising the plurality of 3D measurements corresponding to the first array being shifted in at least one direction;
detecting a mixed signal in the reflected light received at the one or more pixels of the pixel array of the sensor chip by comparing the first depth map at least with the second depth map to determine a measurement difference between the 3D measurements stored in the first array and the second array for each pixel in the pixel array;
identifying one or more edge pixels in the pixel array based on the detected mixed signal, wherein the measurement difference is associated with the one or more edge pixels and is greater than an edge threshold;
removing the 3D measurements corresponding to the one or more edge pixels from the first depth map of the one of a plurality of real-time image frames; and
repeating the generating of the first and second depth maps, the detecting the mixed signal, the identifying of the one or more edge pixels, and the removing the 3D measurements, for each of the plurality of real-time image frames.

11. The method of claim 10, wherein the plurality of measurements corresponding to the first array are shifted in at least one direction including at least one of an upward row shift, a downward row shift, a leftward column shift, a rightward column shift, and a diagonal shift.

12. The method of claim 11, wherein comparing the first depth map with the second depth map further comprises:
comparing the first depth map with a first version of the second depth map, wherein the first version of the second depth map corresponds to the upward row shift;
comparing the first depth map with a second version of the second depth map, wherein the second version of the second depth map corresponds to the downward row shift;
comparing the first depth map with a third version of the second depth map, wherein the third version of the second depth map corresponds to the leftward column shift; and
comparing the first depth map with a fourth version of the second depth map, wherein the fourth version of the second depth map corresponds to the rightward column shift.

13. The method of claim 10, wherein the edge threshold is a constant value for each pixel in the pixel array.

14. The method of claim 10, wherein the edge threshold is an adaptive value that is based on a distance measurement associated with each pixel in the pixel array.

15. The method of claim 10, wherein the edge threshold is an adaptive value that is based on a signal strength measurement associated with each pixel in the pixel array.

16. The method of claim 10, wherein the edge threshold is an adaptive value that is based on an amplitude measurement associated with each pixel in the pixel array.

17. The method of claim 10, wherein the edge threshold is an adaptive value that is based on a signal-to-noise (SNR) ratio associated with each pixel in the pixel array.

18. The method of claim 10, further comprising: generating phase information by the processing of ToF delays.

19. A non-transitory computer-readable media comprising instructions stored thereon which, when executed are configured to cause a computer or processor to:
control a ToF sensor comprising a light source, a sensor chip having a pixel array, and a controller to generate a plurality of real-time image frames of a scene by emitting modulated light from the light source and receiving reflected light within a field of view of the sensor chip, detecting ToF delays in the reflected light at one or more pixels of the pixel array of the sensor chip, processing the ToF delays to generate depth information for the pixels of the pixel array;
generate a first depth map of a first image frame of the plurality of real-time image frames, the first depth map having a first array representative of the pixel array of the sensor chip comprising a plurality of three-dimensional (3D) measurements generated by the ToF sensor;
generate at least a second depth map having a second array representative of the first image frame comprising the plurality of 3D measurements corresponding to the first array being shifted in at least one direction;
detect a mixed signal in the reflected light received at the one or more pixels of the pixel array of the sensor chip by comparing the first depth map at least with the second depth map to determine a measurement difference between the 3D measurements stored in at least the first array and the second array for each pixel in the pixel array;
identify one or more edge pixels in the pixel array corresponding to at least one edge region in the image frame, wherein the measurement difference is associated with the one or more edge pixels and is greater than an edge threshold;
removing the 3D measurements corresponding to the one or more edge pixels from the first depth map of the one of a plurality of real-time image frames; and
repeating the generating of the first and second depth maps, the detecting the mixed signal, the identifying of the one or more edge pixels, and the removing the 3D measurements, for each of the plurality of real-time image frames.

20. The non-transitory computer-readable media of claim 19, wherein the plurality of measurements corresponding to the first array are shifted in at least one direction including at least one of an upward row shift, a downward row shift, a leftward column shift, a rightward column shift, and a diagonal shift.

* * * * *